Sept. 19, 1961   J. J. RILEY   3,001,162
WELDING TRANSFORMER
Filed Nov. 24, 1959   2 Sheets-Sheet 2

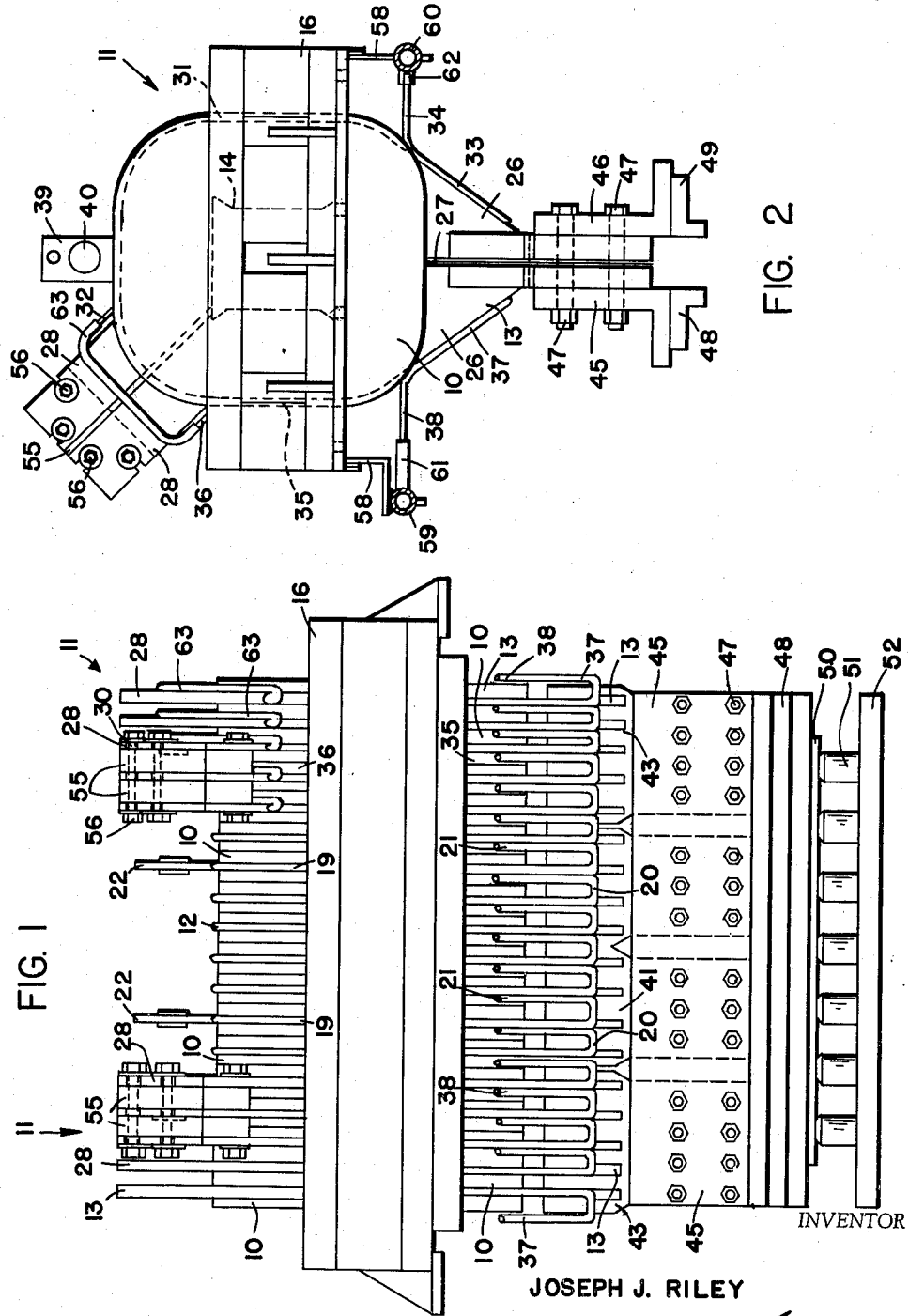

INVENTOR
JOSEPH J. RILEY

BY *Francis J. Klempay*
ATTORNEY

3,001,162
WELDING TRANSFORMER

Joseph J. Riley, Warren, Ohio, assignor to The Taylor-Winfield Corporation, Warren, Ohio, a corporation of Ohio
Filed Nov. 24, 1959, Ser. No. 855,070
6 Claims. (Cl. 336—61)

The present invention relates generally to the welding and transformer arts and more particularly to the provision of an improved welding transformer.

As will be understood, a welding transformer is employed for transforming the line voltage and current to a relatively low voltage at the secondary terminals thereof and, during actual welding operations, extremely high amperage currents are caused to flow in the workpieces to weld the same. The secondary terminals of the welding transformer are usually disposed adjacent to and are electrically connected to welding electrodes which engage the workpieces.

In many types of welding apparatus the welding electrodes extend completely across the workpieces to be welded and the secondary terminals of the welding transformer are generally coextensive with the electrodes. While this arrangement is completely satisfactory when welding wide workpieces, a serious problem is presented when workpieces of less width that are not coextensive with the welding electrodes and the secondary terminals of the welding transformer are being welded. In general, when smaller size workpieces are being welded, the welds near the edges of the workpieces become too hot and overheat due to the extended length of the welding electrodes and the secondary terminals of the welding transformer. While this problem has long been recognized in the art and has substantially limited the employment of such welding apparatus with different size workpieces, no generally acceptable solution thereto has been proposed.

In view of the above, it is the primary or ultimate object of the present invention to provide a welding transformer for welding apparatus of the type above described wherein over-heating of the edges of smaller size workpieces is completely eliminated.

More specifically, it is the object of the present invention to provide a welding transformer which, in accordance with prior art practice, comprises a plurality of primary coils between which are sandwiched a plurality of secondary loops but where the outermost secondary loops on both ends of the welding transformer may be effectively disconnected to eliminate any secondary welding current therein. In this manner the induced welding current is limited to the center of the welding transformer and the electrodes and overheating of the welds at the edges of smaller size workpieces is precluded.

Still another object of the invention is to provide a welding transformer of the type above described which embodies an improved construction for the secondary loops.

A further object of the invention is to provide a welding transformer embodying improved cooling means. Because of the extremely high amperage welding currents involved the dissipation of heat is a problem of major importance and the cooling means of the present invention very effectively carries away such heat as will be hereinafter more fully explained.

Still another object of the invention is to provide a welding transformer having the characteristics outlined above which is adapted to be easily and readily employed by the operators of the welding apparatus.

The above, as well as other objects and advantages, will become more apparent upon consideration of the following specification and claims wherein there is disclosed certain preferred embodiments of the invention.

In the drawing:

FIGURE 1 is a longitudinal side view of a welding transformer constructed in accordance with the teachings of the present invention;

FIGURE 2 is an end view of the welding transformer shown in FIGURE 1;

Figure 4:
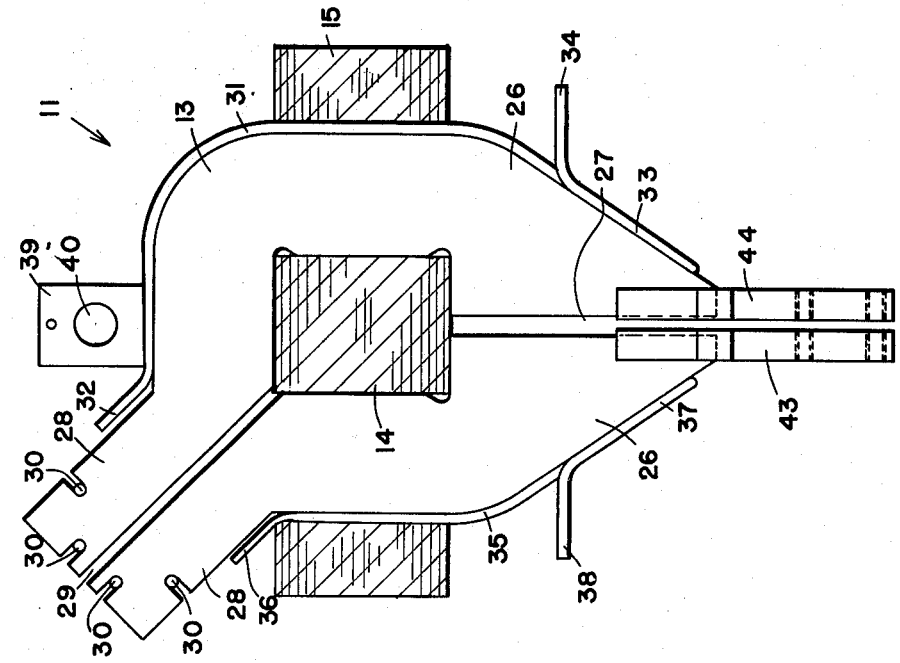
FIGURE 4 is an end view of one of the end secondary loops employed in my improved welding transformer.

Referring now to the drawing, and initially to FIGURES 1 and 2 thereof, the reference numeral 10 indicates a plurality of axially aligned and spaced primary windings between which are sandwiched in an alternating manner a plurality of secondary loops generally designated by the reference numeral 11. The secondary loops 11 comprise a plurality of center secondary loops 12 and a plurality of end secondary loops 13, the construction of which will be hereinafter more fully explained. In the illustrated embodiment of the invention the welding transformer is shown to comprise eight of the center secondary loops 11 and ten of the end secondary loops 13—five of the end secondary loops 13 being disposed at each end of the center portion of the welding transformer comprising the center secondary loops 12.

Each of the secondary loops 11 is fabricated from a highly current conductive material, such as copper, for example, and has a generally rectangular center opening 14 therein. In accordance with usual practice, a suitable laminated iron core 15 is provided about the assembled primary windings 10, end secondary loops 13 and center secondary loops 12 and through the center openings 14 thereof. The primary windings, the secondary loops and the laminated iron core are retained in assembled relation by suitable through bolts and clamping pads, not particularly shown, and a generally rectangular housing 16 surrounds the assembled transformer. The housing 16, in addition to maintaining the various components of the welding transformer in assembled relation, provides a convenient means for mounting the welding transformer in the welding apparatus. While the illustrated embodiment the welding transformer is shown to comprise eight of the center secondary loops 12 and ten of the end secondary loops 13 it should be understood that this is in no manner intended to limit the present invention since any number of and/or combination of the various secondary loops may be provided as is required for any given installation.

Figure 3:
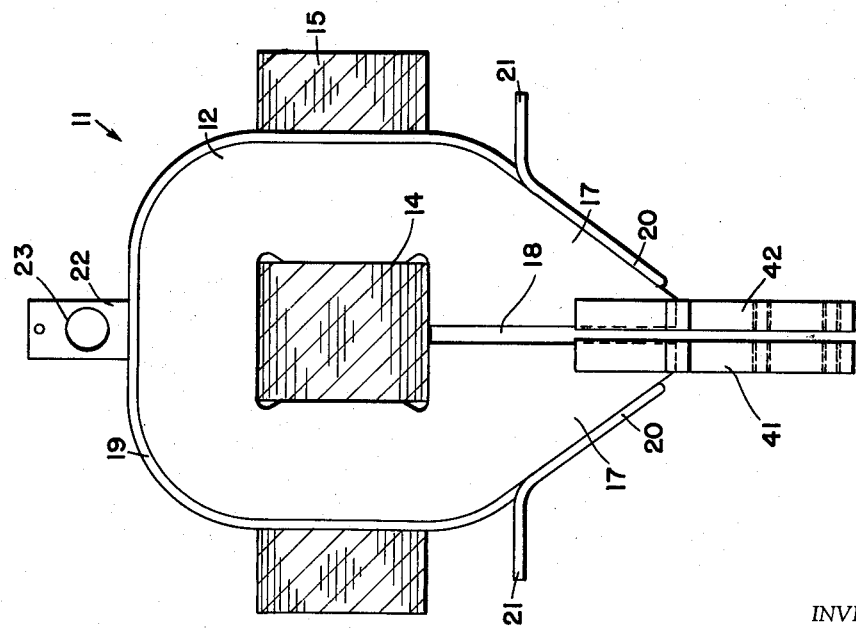
FIGURE 3 is an end view of one of the center secondary loops of the welding transformer.

Referring now to FIGURE 3 of the drawing, each of the center secondary loops 12 is generally U-shaped and has a pair of inwardly tapering lower leg portions 17 which are separated by a vertically extending slot 18 that communicates with the rectangular center opening 14 therethrough. Each of the center secondary loops 12 also has welded or otherwise attached to its outer periphery a current conductive coolant conduit 19 whose end portions are turned to extend vertically at 20 and terminate in the laterally projecting coolant connectors 21. The arrangement is such that the vertically extending portions 20 of the coolant conduit 19 for each of the center secondary loops 12 are disposed adjacent another one of the secondary loops when the welding transformer is assembled as is clearly shown in FIGURE 1 of the drawing. A pair of the center secondary loops 12 have upstanding grounding lugs 22 projecting from the top edge thereof which are provided with apertures 23.

Each of the end secondary loops 13 is also generally U-shaped and comprises a pair of downwardly extending and inwardly tapering leg portions 26 which are separated by a vertically extending slot 27 that communicates with the center opening 14. The upper left corner of each of the end secondary loops comprises a pair of outwardly and upwardly extending terminal connector portions 28 that are separated by a diagonally extending slot 29 which extends inwardly to the upper left corner of the rectangular center opening 14. Each of the terminal connector portions 28 has a pair of notches 30 in the edges thereof at its outer end for purposes to be hereinafter more fully explained. Also, it is contemplated that the major surface areas of the terminal connector portions 28 will be silver plated. Attached to the right outer peripheral edge of each end secondary loop is a current conductive coolant conduit 31 whose upper end portion 32 terminates adjacent the upper terminal connector portion 28 and whose other end portion is formed to define a vertically extending portion 33 and a laterally projecting coolant connector portion 34. A similar coolant conduit 35 is attached to the left peripheral edge of each end secondary loop 13 and one end portion 36 terminates adjacent the lower terminal connector portion 28 while the other end portion is U-shaped to define a vertically extending portion 37 and a laterally projecting coolant connector 38. As will be apparent from inspection of FIGURE 1 of the drawing, the vertically extending portions 33 and 37 of the coolant conduits 31 and 35, respectively, of each end secondary loop are disposed adjacent another of the secondary loops when the welding transformer is assembled. A pair of the end secondary loops 13 are provided with upstanding grounding lugs 39 having apertures 40 therein.

The lower ends of the center secondary loops 12 are received in suitable slots in a pair of spaced center secondary terminal pads 41 and 42. In a similar manner the ends of each of the end secondary loops of each bank thereof are received in slots in a pair of spaced end secondary terminal pads 43 and 44. The spaced secondary terminal pads are insulated from each other and have attached to the outer faces thereof the elongated and L-shaped conductor bars 45 and 46. The conductor bars 45 and 46 extend the complete length of the secondary terminal pads 43, 41 and 43 and 44, 42 and 44, respectively, and each defines, in effect, an equal potential bus. The secondary terminal pads and the conductor bars are held in clamped assembled relation by a plurality of insulated bolt and nut assemblies 47. Attached to the lower faces of the conductor bars 45 and 46 are a pair of elongated and spaced current conductive welding dies or electrodes 48 and 49. These welding electrodes are adapted to engage workpieces 50 and 51 and to clamp the same against a current conductive platen 52 for welding the workpieces to each other. The workpieces 50 and 51 are shown to comprise a grating whose width dimension is such that the same does not extend the complete length of the welding electrodes 48 and 49. When the welding transformer is properly energized welding current is caused to flow from one of the welding electrodes down through the workpieces 50 and 51, then laterally along the current conductive platen 52 and then upwardly through the workpieces to the other of the welding electrodes to complete a series weld at spaced points between the workpieces as is well known in the art.

It will be noted that the end secondary loops 13 are effectively and individually open circuited due to the diagonal slots 29 extending between and separating the terminal connector portions 28 thereof. To effectively close the end secondary loops there are provided a plurality of generally rectangular and highly current conductive connector blocks 55. The connector blocks 55 each have a thickness dimension whereby the two major surface areas thereof engage the adjacent major surface areas of the terminal connector portions 28 of the adjacent end secondary loops 13. The connector blocks 55 have through apertures therein which coincide with the notches 30 in the edges of the terminal connector portions 28 of the end secondary loops. The terminal connector portions 28 of the end secondary loops and the connector blocks 55 are held in clamped assembled relation by a plurality of bolt and nut assemblies 56 which extend through the notches 30 and the apertures in the connector blocks. The arrangement is such that a highly efficient and low loss current conductive bridge is provided between the terminal connector portions 28 of the end secondary loops 13.

In FIGURE 1 of the drawing only four connector blocks are shown whereby the two outer end secondary loops 13 on each end of the welding transformer are open circuited. Thus, the two end secondary loops on each end of the welding transformer are effectively disconnected whereby the operative portion of the welding transformer comprises the center secondary loops 12 and those end secondary loops 13 whose terminal connector portions 28 are bridged by the connector blocks 55. The workpieces 50 and 51 are shown as coextensive with the operative portion of the welding transformer whereby a fairly uniform current distribution will be evidenced across the width of the workpieces during actual welding operations. This arrangement effectively eliminates the problem of excessive current concentration in the edges of the workpieces when the same are not of a width which equals the width of the welding electrodes and the welding transformer. Thus, if all of the end secondary loops 13 were connected into the welding transformer by providing of additional connector blocks 55, the welds at the edges of the workpieces 50 and 51 would be overheated and, in all probability, be defective.

When all of the end secondary loops are connected into the welding transformer eight of the connector blocks 55 would be employed and, of course, the nut and bolt assemblies 56 would be replaced with longer like assemblies. In this instance the width of the workpieces would extend the entire length of the welding electrodes 48 and 49. As should now be readily apparent, the end secondary loops 13 can be individually connected or disconnected from the welding transformer in accordance with the width dimensions of the workpieces being welded. It will be noted that the terminal connector portions 28 of the end secondary loops project diagonally outward from the main body of the welding transformer whereby the same are readily accessible and completely exposed. Usually and preferably the workpieces will be positioned beneath the center of the welding transformer whereby the end secondary loops on opposite ends of the welding transformer may be connected or disconnected in a symmetrical manner. It is also contemplated that the grounding lugs 22 and 39 of the various secondary loops provided therewith will be connected to a bus bar, not shown, extending through the apertures 23 and 40 which will in turn be grounded to the transformer core clamp, for example. It is preferred that the primary windings 10 be interconnected through a multiple position switch whereby those primary windings disposed adjacent the disconnected end secondary loops 13 may be deenergized.

Depending from the elongated edges of the transformer housing 16 on opposite sides of the secondary loops are structural members 58 which support elongated coolant manifolds 59 and 60. The coolant manifold 59 is connected to the laterally projecting coolant connectors 21 and 38 of the coolant conduits 19 and 35, respectively, by fittings 61 while the coolant manifold 60 is connected by fittings 62 to the laterally projecting coolant connectors 21 and 34 of the coolant conduits 19 and 31. To complete the cooling means for the end secondary loops 13 there are provided a plurality of generally U-shaped non-conductive coolant conduits 63 which interconnect the end portions 32 and 36 of the coolant conduits 31 and 35. The U-shaped conduits 63 extend along the sides of the terminal connector portions 28 of the end secondary loops below the connector blocks 55. The arrangement is such that coolant is supplied under pressure from a suitable source thereof, not shown, while the other coolant manifold is also connected to the source whereby the coolant is caused to circulate through the various coolant conduits 19, 31, 35 and 63. The cooling means described is highly efficient and very effectively dissipates the heat generated during normal operation of the welding transformer. It will be noted that the vertical portions 20, 33 and 37 of the various coolant conduits provide additional cooling capacity where the cross sectional areas of the various secondary loops are the smallest and the current densities are the highest. Of course, if desired, the secondary terminal pads 43 and 44 along with the conductor bars 45 and 46 may have suitable passageways formed therein for the flow of coolant.

It should thus be apparent that I have accomplished the objects initially set forth. Since many changes may be made in the disclosed embodiment without departing from the teachings of this invention reference should be had to the following appended claims in determining the true scope and intent of the invention.

I claim:

1. A welding transformer comprising a plurality of flat spaced parallel generally oval shaped multi-turn primary windings, a plurality of flat spaced parallel generally U-shaped current conductive secondary loops, said secondary loops being interposed between said primary windings, said secondary loops each having a pair of spaced leg portions projecting beyond the physical outlines of said primary windings, said leg portions defining secondary terminal portions, at least a portion of said secondary loops each having a pair of spaced terminal connector portions, said terminal connector portions extending beyond said physical outlines of said primary windings, and removable terminal current conducting means bridging said terminal connector portions of said portion of said secondary loops.

2. Apparatus according to claim 1 further characterized in that said means bridging comprises a plurality of current conductive connector blocks, each of said connector blocks being received between a pair of said portions of said secondary loops and lying adjacent said terminal connector portions thereof, and clamping means for removably clamping said connector blocks and said terminal connector portions to each other.

3. Apparatus according to claim 1 further characterized in that said portion of said secondary loops with said terminal connector portions are disposed in symmetrical relation at the opposite ends of said welding transformer.

4. Apparatus according to claim 1 further comprising cooling means for said welding transformer, said cooling means comprising a coolant conduit attached to one outer peripheral edge of each of said portion of said secondary loops, one end of said coolant conduit terminating adjacent one of said terminal connector portions, a second coolant conduit attached to the other outer edge of each of said portion of said secondary loops, one end of said second conduit terminating adjacent the other of said terminal connector portions, and a non-conductive U-shaped coolant conduit interconnecting said ends of said first mentioned and said second coolant conduits.

5. A welding transformer comprising a plurality of primary windings, a plurality of generally U-shaped current conductive secondary loops interposed between said primary windings, said secondary loops having output terminal means connected thereto, at least a portion of said secondary loops having a pair of spaced and outwardly extending terminal connector portions, removable current conductive means spanning said pairs of terminal connector portions, said current conductive means comprising a current conductive block disposed between a pair of said portions of said secondary loops adjacent said pairs of terminal connector portions thereof, means clamping said pairs of terminal connector portions to said current conductive block, each of said terminal connector portions comprising a tab-like member, a plurality of notches about the edges of said tab-like members, apertures in said current conductive block, and clamping bolt and nut assemblies extending through said apertures and said notches.

6. A welding transformer comprising a core and a plurality of spaced and generally parallel primary windings assembled on said core, a plurality of generally parallel secondary loops interposed between said windings on said core and each having a pair of spaced leg portions projecting beyond the physical outlines of said windings for connection to a pair of elongated spaced parallel welding electrodes, certain of said loops each having a break therein at a point circumferentially spaced from said leg portions and each having terminal portions on opposite sides of the break projecting beyond the physical outlines of said windings, and removable current conducting means bridging said terminal portions of the respective loops to close the breaks therein.

References Cited in the file of this patent
UNITED STATES PATENTS

| | | |
|---|---|---|
| 2,274,169 | Schiff | Feb. 24, 1942 |
| 2,719,946 | Riley | Oct. 4, 1955 |
| 2,790,055 | Van Iperen | Apr. 23, 1957 |
| 2,836,802 | Gelpi et al. | May 27, 1958 |